United States Patent
Lai et al.

(10) Patent No.: US 8,134,898 B2
(45) Date of Patent: Mar. 13, 2012

(54) METHOD AND DEVICE FOR PROTECTING A PLL IN READING SIGNALS ON A DEFECT DISC

(75) Inventors: Yi-Lin Lai, Taipei (TW); Yi-Sung Chan, Taipei (TW)

(73) Assignee: VIA Technologies, Inc., Taipei (TW)

( * ) Notice: Subject to any disclaimer, the term of this patent is extended or adjusted under 35 U.S.C. 154(b) by 1417 days.

(21) Appl. No.: 11/376,174

(22) Filed: Mar. 16, 2006

(65) Prior Publication Data

US 2006/0215520 A1    Sep. 28, 2006

Related U.S. Application Data

(60) Provisional application No. 60/662,351, filed on Mar. 17, 2005.

(51) Int. Cl.
 *G11B 7/00* (2006.01)
(52) U.S. Cl. .................. 369/53.15; 369/47.14
(58) Field of Classification Search ............... 369/53.15, 369/47.14, 47.43, 124.04, 124.14, 53.34, 369/53.12; 360/46, 77.02; 331/17, 175
See application file for complete search history.

(56) References Cited

U.S. PATENT DOCUMENTS

| | | | | |
|---|---|---|---|---|
| 5,956,307 A * | 9/1999 | Koudo et al. | | 369/47.43 |
| 5,995,305 A * | 11/1999 | McNeil et al. | | 360/31 |
| 6,259,663 B1 * | 7/2001 | Tateishi | | 369/53.12 |
| 6,363,042 B1 | 3/2002 | Sakashita | | |
| 6,542,041 B2 * | 4/2003 | Choi | | 331/17 |
| 2004/0088637 A1 | 5/2004 | Wada | | |
| 2004/0145987 A1 | 7/2004 | Ryu et al. | | |
| 2005/0078580 A1 * | 4/2005 | Kochale et al. | | 369/53.15 |

* cited by examiner

*Primary Examiner* — Will J Klimowicz
*Assistant Examiner* — Emily Frank
(74) *Attorney, Agent, or Firm* — Stout, Uxa, Buyan & Mullins, LLP

(57) ABSTRACT

A device for protecting a PLL in reading signals on a defect disc from disturbance and instability is provided. The device includes a defect detection unit, a logic combination unit and a PLL. The defect detection unit receives a plurality of defect detection signals to detect various defects for setting a plurality of defect flag signals, wherein the plurality of defect detection signals include at least an envelope of RF signal and bit modulation signals. The logic combination unit performs logic operation on the defect flag signals in order to detect a specified defect. Wherein, when the specified defect is detected, the PLL uses different bandwidths to compensate a digitalized RF signal affected by the specified defect. A method for protecting a PLL in reading signals on a defect disc is also provided.

7 Claims, 7 Drawing Sheets

METHOD AND DEVICE FOR PROTECTING A PLL IN READING SIGNALS ON A DEFECT DISC

RELATED APPLICATIONS

The present application is based on, and claims priority from, U.S. Application No. 60/662,351, filed Mar. 17, 2005, the disclosure of which is hereby incorporated by reference herein in its entirety.

BACKGROUND OF THE INVENTION

1. Field of the Invention

This invention generally relates to the field of device protection of Optical disc drive (ODD). More particularly, the present invention relates to a method and device that protects a phase lock loop (PLL) of ODD in reading signals on a defect disc.

2. Description of the Prior Art

Nowadays, disc-type storage media are broadly used in keeping data due to their storage capacity. Such disc-type storage media like optical discs, i.e. CD-R discs, CD-RW discs, DVD-R discs, DVD-RW discs, DVD+R discs, DVD+RW discs, or DVD-RAM discs etc., also provide better protection to the data stored on them against damage. However, these characteristics mentioned above do not mean the optical discs are faultless storage media for storing data because some defects might either take place on their surfaces. For example, a deep scratch, a shallow scratch, and even a fingerprint. These defects could result in not only reading or writing errors but also a system disturbance while the system reads or writes data. Hence, it is an important thing to detect existing defects for protecting the system from a disturbed or instable situation.

It is well known to use the difference of signal amplitude, such as an RF level (RFLVL) or a sub-beam added (SBAD) signal, to detect an existing defect. FIG. 1A illustrates signals of a deep defect detected by applying well-known RFLVL detection. As shown in FIG. 1A, a defect detection applying the RFLVL is illustrated. An RF signal 110 has a hollow region 112 in a time period 120. That means the corresponding data of the hollow region 112 is damaged by a defect, so that the RF signal 110 in the time period 120 cannot be read out. Further, the depth of the hollow region 112 represents the depth of the defect. An RFLVL signal 114, which is formed from the RF signal 110 passing a low pass filter, shows the envelope of the RF signal 110. A detection threshold 130 is a fixed DC referred voltage level. As the RFLVL signal 114 is lower than the detection threshold 130 in the time period 120, a defect flag signal 140 is raised from "0" to "1". Moreover, a FE/TE signal 150 respectively generates a positive surge 152 and a negative surge 154 at the beginning and the end of the time period 120 to indicate a focusing and a tracking error signal. However, while the defect flag signal 140 is set from "0" to "1", a servo system, such as a focusing or a tracking servo, and a data path control system, such as a preamplifier, a slicer, or a phase lock loop (PLL), can detect a defect signal and then reduce the potential disturbance and instability through applying some appropriately protective methods and devices.

FIG. 1B illustrates signals of a shallow defect detected by applying well-known RFLVL detection. In FIG. 1B, an RF signal 110-1 has a hollow region 112-1 in a time period 120-1. That also means the corresponding data of the hollow region 112-1 is damaged by a defect, so that the RF signal 110-1 in the time period 120-1 cannot be totally read out. But, the depth of the hollow region 112-1 is not deep as the hollow region 112 shown in FIG. 1A since it might just result from a shallow defect, such as a shallow scratch. An RFLVL signal 114-1 shows the envelope of the RF signal 110-1. A detection threshold 130-1 is a fixed DC referred voltage level like the detection threshold 130 shown in FIG. 1A. Obviously, the RFLVL signal 114-1 is always higher than the detection threshold 130-1 because the shallow defect does not make the hollow region 112-1 deep enough. Hence, not only a defect flag signal 140-1 has no response to the shallow defect, but also a FE/TE signal 150-1 has no apparently change except a little noise. Furthermore, since the shallow defect is not detected, some protective methods and devices are not triggered to protect the system from the potential disturbance and instability. In other words, the servo systems and the data path control systems are easily affected by the disturbance and instability in this defect situation.

Similarly, referring to FIG. 1C, illustrating signals of a fingerprint detected by applying well-known RFLVL detection, an RF signal 110-2 has a hollow region 112-2 in a time period 120-2. That means the corresponding data of the hollow region 112-2 is slightly affected by a defect, so that the RF signal 110-2 in the time period 120-2 has weaker amplitudes. Also, the depth of the hollow region 112-2 is not deep like the hollow region 112-1 shown in FIG. 1B, since it might just result from a shallow defect, such as a fingerprint. An RFLVL signal 114-2 shows the envelope of the RF signal 110-2 and a detection threshold 130-2 is a fixed DC referred voltage level like the detection threshold 130 shown in FIG. 1A. The RFLVL signal 114-2 is always higher than the detection threshold 130-2' in this defect situation, because the shallow defect does not make the hollow region 112-2 deep enough. Thus, not only a defect flag signal 140-2 has no response to the shallow defect, but also a FE/TE signal 150-2 has no apparently change except a little noise. This situation is similar to the situation described in FIG. 1B; the servo systems and the data path control systems cannot be safely protected. On the other hand, however, the defects shown in FIG. 1B and FIG. 1C further include different statuses according to their damaged depth, width and direction; some defects might still have original data, but others have only destroyed data. Therefore, it is difficult to determine the defect flag signal simply by the detection threshold comparison.

In view of the drawbacks mentioned with the prior art of device protection, there is a continued need to develop a new and improved method and device that overcomes the disadvantages associated with the prior art of device protection. The advantages of this invention are that it solves the problems mentioned above.

SUMMARY OF THE INVENTION

A device for protecting a PLL in reading signals on a defect disc from disturbance and instability is provided. The device includes a defect detection unit, a logic combination unit and a PLL. The defect detection unit receives a plurality of defect detection signals to detect various defects for setting a plurality of defect flag signals, wherein the plurality of defect detection signals include at least an envelope of RF signal and bit modulation signals. The logic combination unit performs an logic operation on the defect flag signals in order to detect a specified defect. Wherein, when the specified defect is detected, the PLL uses different bandwidths to compensate a digitalized RF signal affected by the specified defect.

The present invention further discloses a method for protecting a PLL in reading signals on a defect disc is also provided. The method includes the following steps. At first, receiving a plurality of defect detection signals for setting a plurality of defect flag signals, wherein the plurality of defect detection signals include at least an envelope of RF signal and bit modulation signals. Next, executing logic operation on the defect flag signals in order to detect a specified defect. Finally, using different bandwidths to compensate a digitalized RF signal affected by the specified defect when detecting the specified defect

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

Figures 1A, 1B, 1C:
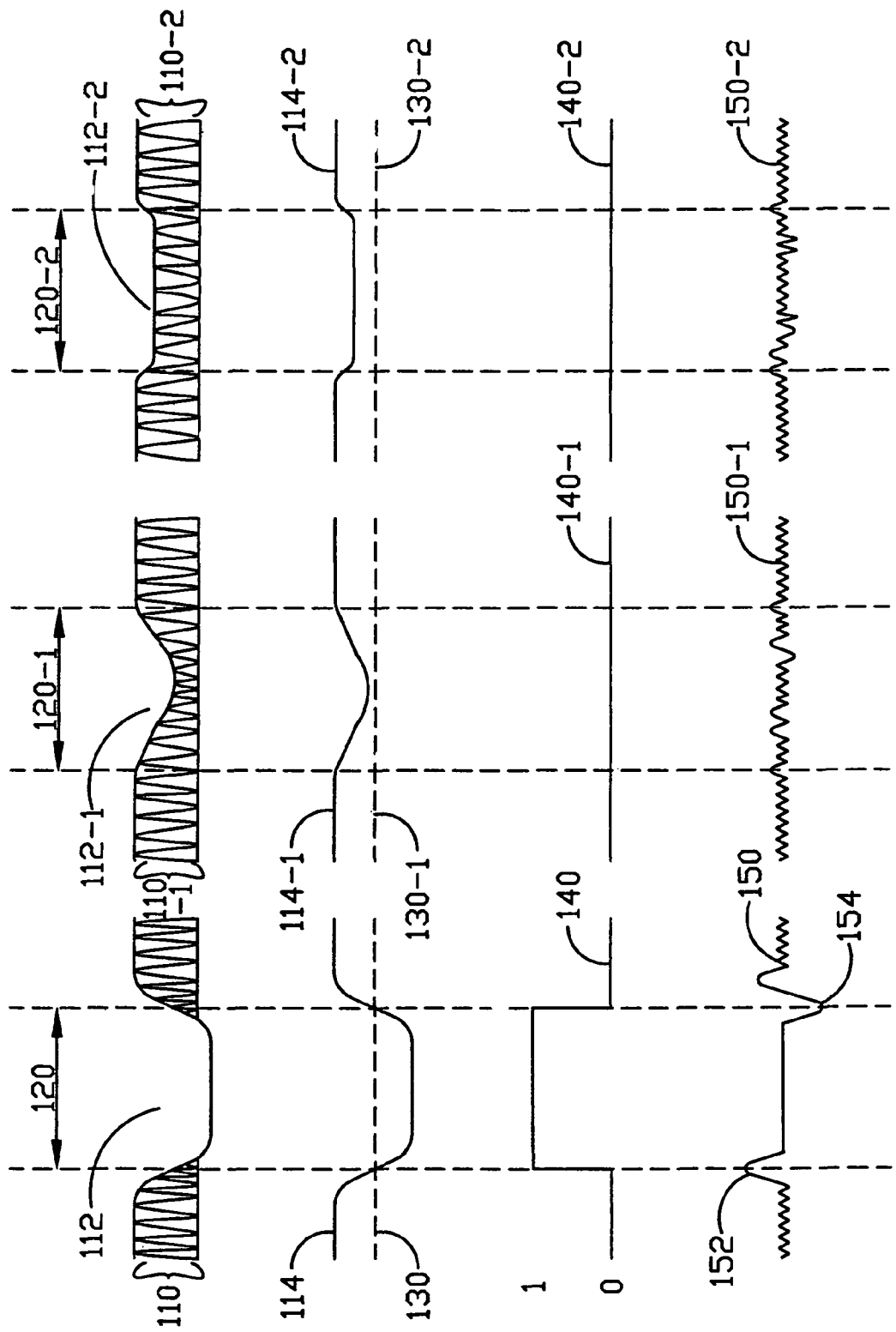
FIG. 1A illustrates signals of a deep defect detected by applying well-known RFLVL detection.
FIG. 1B illustrates signals of a shallow defect detected by applying well-known RFLVL detection.
FIG. 1C illustrates signals of a fingerprint detected by applying well-known RFLVL detection.
Figure 2:
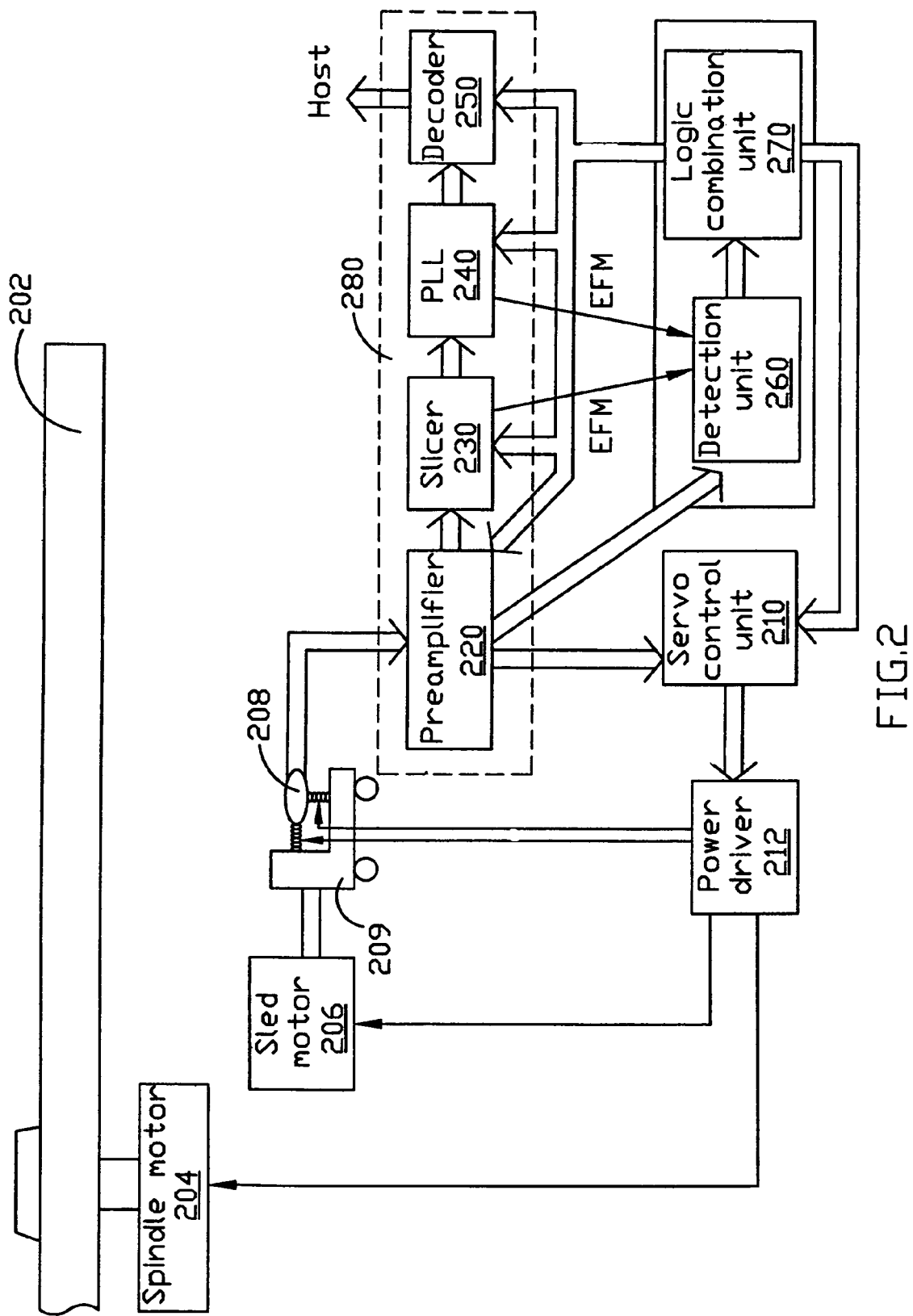
FIG. 2 illustrates a schematic defect detection device block diagram in accordance with the present invention.

FIG. 2 illustrates a schematic defect detection device block diagram in accordance with the present invention. In FIG. 2, a servo control unit 210 handles the related electromechanical devices, such as the spin rate of a spindle motor 204, the move of a sled motor 206, and the slightly tracking and focusing move of a lens 208, through a power driver 212. That is, the servo control unit 210 can make the lens 208 not only aim at the right track of a disc 202 but also have a well focus for data reading and transferring. Through roughly moving a pick-up head 209 and slightly tracking move of the lens 208 at the horizontal direction, and slightly focusing move of the lens 208 at the vertical direction, the servo control unit 210 can make the lens 208 focus well on the right track of the disc 202. A data path control unit 280 includes a preamplifier 220, a slicer 230, a phase lock loop (PLL) 240, and a decoder 250. The preamplifier 220 receives data signals from the pick-up head 209 and generates various signals, such as RF signals for data process, servo control signals, i.e. a FE/TE signal, for the servo control unit 210, and other signals, such as bit modulation signals, i.e. eight to fourteen bit modulation (EFM) signals and RF level (RFLVL) signals, etc., for defect detection. The slicer 230 digitalizes the RF signals transferred from the preamplifier 220. The PLL 240 synchronizes the digitalized RF signals to a system clock and counts the length of the digitalized RF signals according to the system clock. The decoder 250 decodes the length of the digitalized RF signal to a host (not shown).

A defect detection unit 260 receives the various signals from the preamplifier 220, and EFM signals from the slicer 230 and the PLL 240 to detect different kinds of defects through different defect detections to set corresponding defect flag signals. Wherein, the different defect detections include ADefect detection, ADefect1 detection, EFMDefect detection, RPDefect detection, Interruption detection, and DSPDefect detection, so as to set ADefect flag signal, ADefect1 flag signal, EFMDefect flag signal, RPDefect flag signal, Interruption flag signal and DSPDefect flag signal. A microprocessor or a Digital Signal Processor (DSP) could be used as the defect detection unit 260. The firmware of the foregoing defect detections could be stored in the detection unit 260 to perform corresponding defect detection. A logic combination unit 270 executes an appropriate logic operation, simply, such as an OR operation or an AND operation, on the defect flag signals to precisely improve the defect detection. As the operation result indicates in a defect situation, the logic combination unit 270 triggers defect protection methods and devices to protect the corresponding units, such as the servo control unit 210, the preamplifier 220, the slicer 230, the PLL 240, and the decoder 250.

Figure 3A:
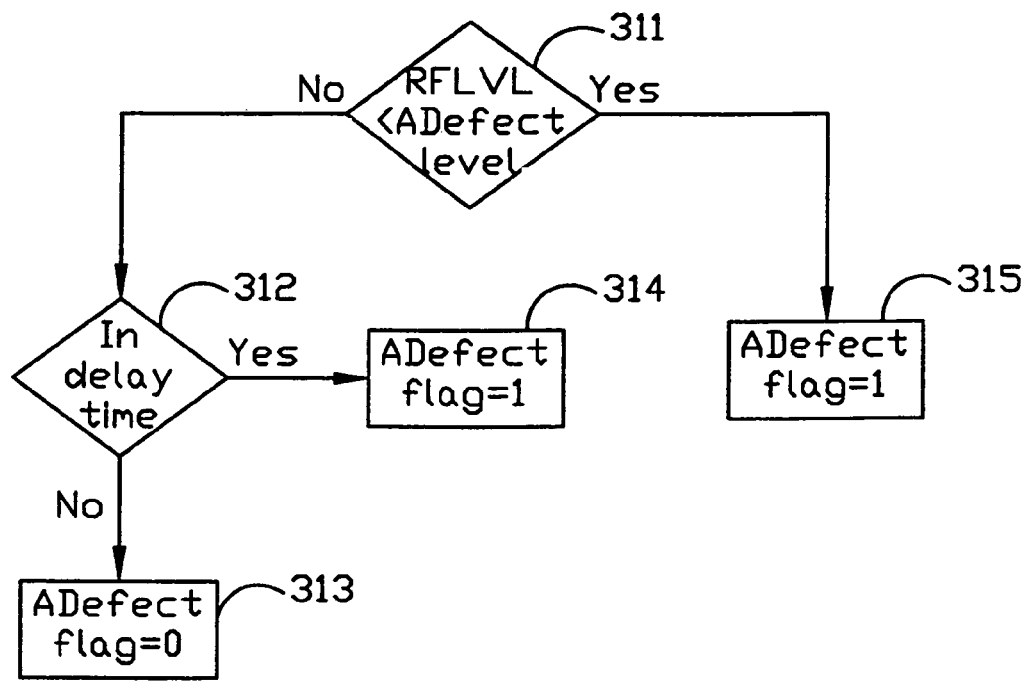
FIG. 3A~3F illustrate flow charts of defect detection in according with the present invention.

FIGS. 3A~3F show the flow charts of defect detection method in accordance with present invention. Referring to FIG. 3A, ADefect detection is illustrated. In step 311, comparing an RFLVL signal with an ADefect level. Wherein the RFLVL signal is the envelope of an RF signal and the ADefect level is a fixed DC referred voltage level. An ADefect flag is set to "1" in step 315 while the RFLVL signal is lower than the ADefect level. When the RFLVL signal is higher than the ADefect level, and then judging whether the RFLVL signal is in defect delay time or not (step 312). In step 314, the ADefect flag is set to "1" while the RFLVL signal is in defect delay time. However, while the RFLVL signal is higher than the ADefect level and is not in the defect delay time, the ADefect flag is set to "0" in step 313. The ADefect detection is appropriately used for detecting a deep defect, such as a scratch. When the ADefect flag signal transit from "0" to "1", it means a defect is detected.

Figure 3B:
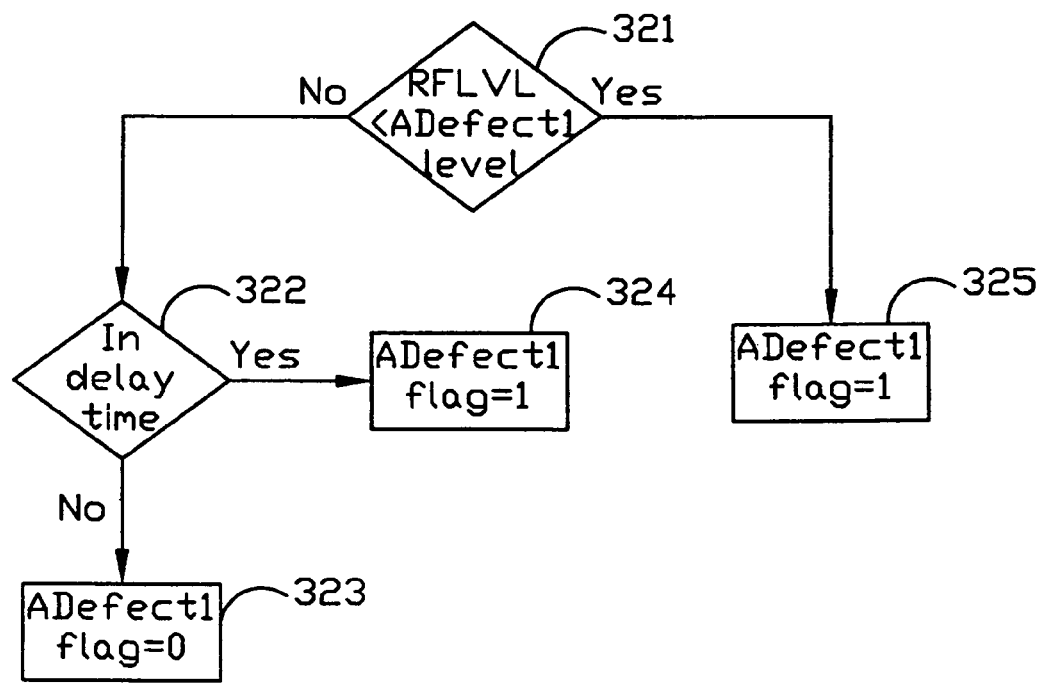

Referring to FIG. 3B, the flow charts of ADefect1 detection is illustrated. All steps in FIG. 3B are similar to those in FIG. 3A. In step 321, comparing an RFLVL signal with an ADefect1 level. Wherein the RFLVL signal is the envelope of an RF signal and the ADefect1 level is a fixed DC referred voltage level. The difference between the ADefect level and ADefect1 level is that the ADefect1 level is higher than the ADefect level. Hence, the ADefect1 detection is more sensitive than ADefect detection for shallow defect and fingerprint. An ADefect1 flag is set to "1" in step 325 while the RFLVL signal is lower than the ADefect1 level. When the RFLVL signal is higher than the ADefect1 level, and then judging whether the RFLVL signal is in defect delay time or not (step 322). In step 324, the ADefect1 flag is set to "1" while the RFLVL signal is in defect delay time. However, while the RFLVL signal is higher than the ADefect1 level and is not in the defect delay time, the ADefect1 flag is set to "0" in step 323. When the ADefect1 flag signal transit from "0" to "1", it means a defect is detected.

Figure 3C:
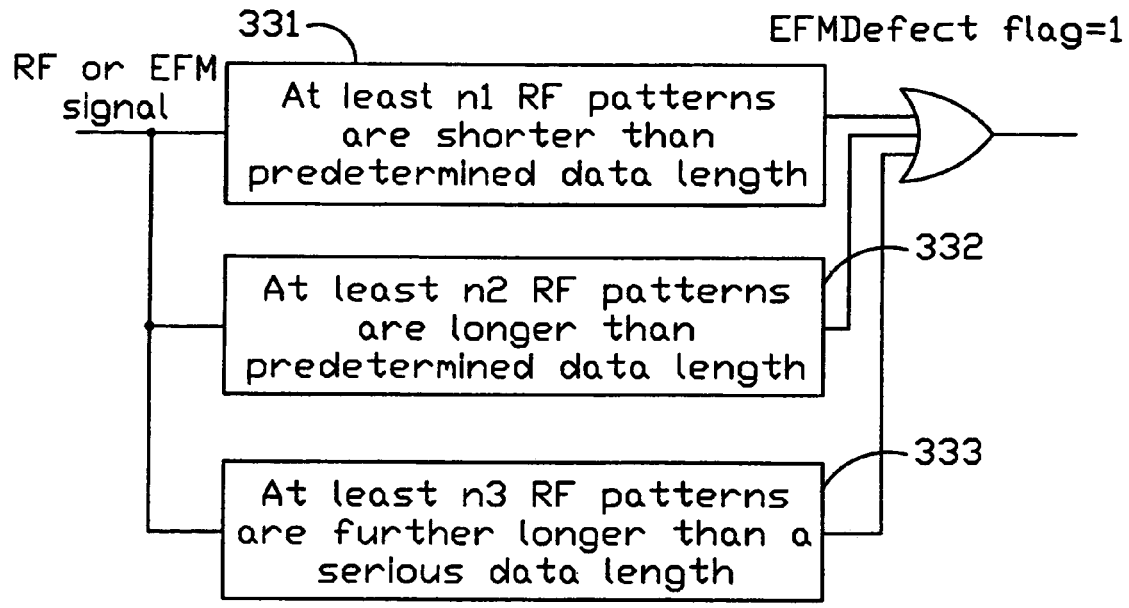

Referring to FIG. 3C, the flow charts of EFMDefect detection is illustrated. In step 331, while a data sector or a data frame has at least n1 RF patterns are shorter than a first predetermined data length, the EFMDefect flag is set to "1". For example, the first predetermined data length is 3T for both CD and DVD data. In step 332, while the data sector or the data frame has at least n2 RF patterns are longer than a second predetermined data length, the EFMDefect flag is set to "1". For example, the second predetermined data length is respectively 11T and 14T for CD and DVD data. In step 333, while the data sector or the data frame has at least n3 RF patterns are longer than a serious data length, such as 18T, the EFMDefect flag is set to "1". On the other hand, while a data sector or a data frame has at least n4 RF patterns are between the first and the second predetermined data length, the EFMDefect flag is set to "0". The EFMDefect detection is appropriately used for detecting an abnormal data length and it is real-time defect detection. Wherein, the EFMDefect detection is more sensitive while the variables n1, n2, n3, and n4 have small values. When the EFMDefect flag signal transit from "0" to "1", it means a defect is detected.

Figure 3D:
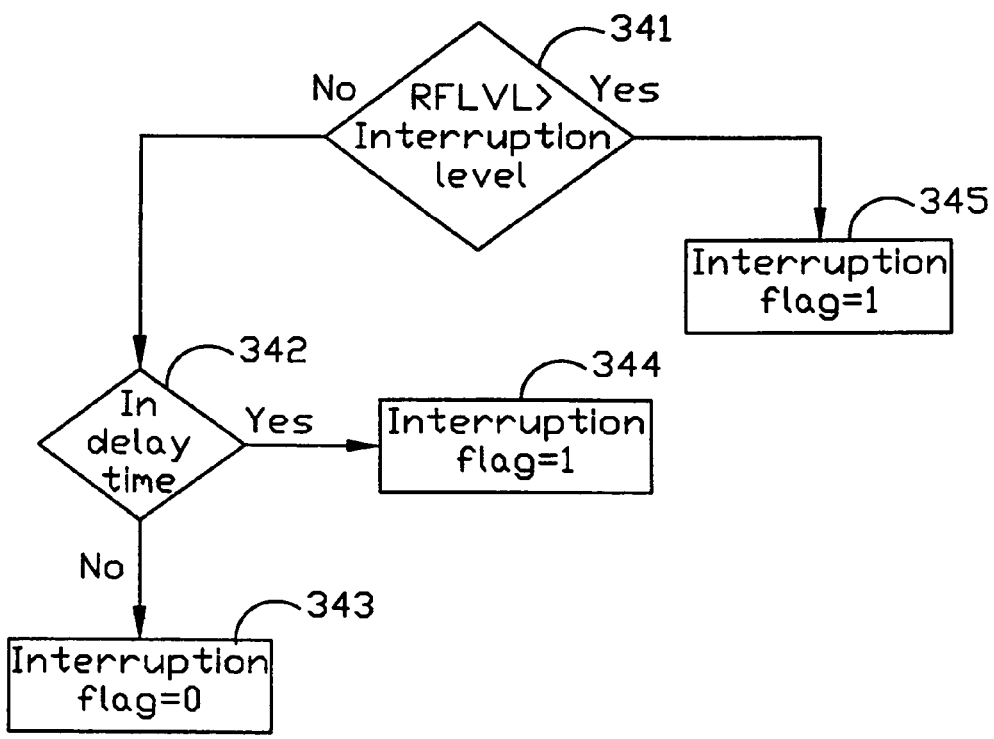

Referring to FIG. 3D, the flow charts of Interruption detection is illustrated. All steps in FIG. 3D are similar to those in FIG. 3A. In step 341, comparing an RFLVL signal with an Interruption level. Wherein the RFLVL signal is the envelope of an RF signal and the Interruption level is a fixed DC referred voltage level. The Interruption level setting is higher than the RFLVL signal in order to detect a defect resulted from strong reflection. An Interruption flag is set to "1" in step 345 while the RFLVL signal is higher than the Interruption level. When the RFLVL signal is lower than the Interruption level, and then judging whether the RFLVL signal is in defect delay time or not (step 342). In step 344, the Interruption flag is set to "1" while the RFLVL signal is in defect delay time. However, while the RFLVL signal is lower than the Interruption level and is not in the defect delay time, the Interruption flag is set to "0" in step 343. When the Interruption flag signal transit from "0" to "1", it means a defect is detected.

Figure 3E:
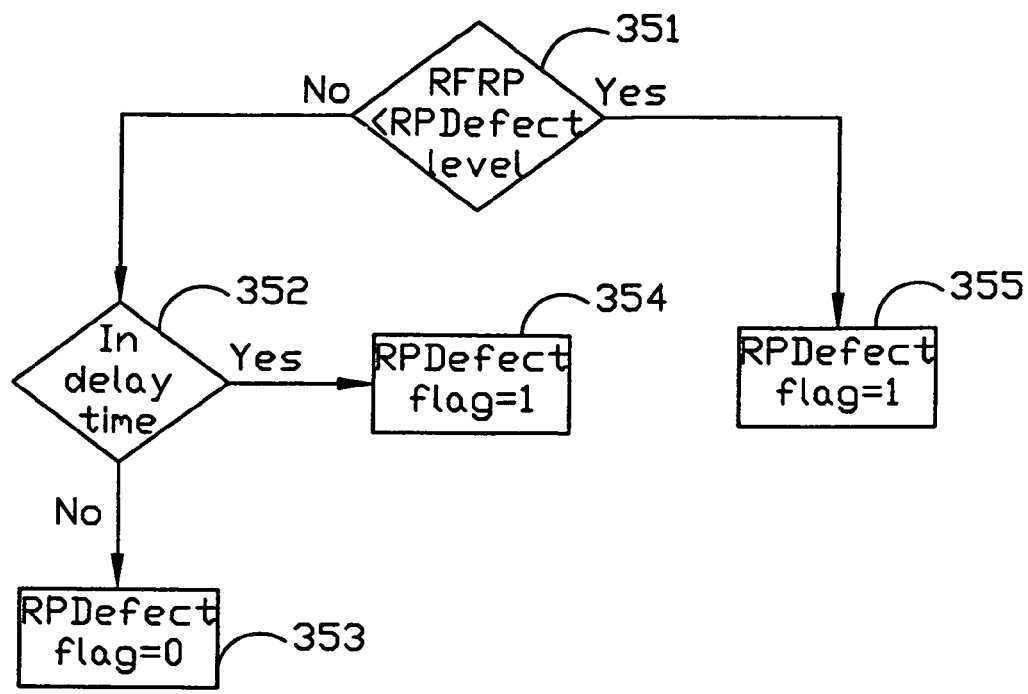

Referring to FIG. 3E, the flow charts of RPDefect detection is illustrated. All steps in FIG. 3E are similar to those in FIG. 3A. In step 351, comparing an RFRP signal with an RPDefect level. Wherein the RFRP signal could be the peak or the bottom envelope of an RF signal and also could be the peak to the bottom of the RF signal and the RPDefect level is a fixed DC referred voltage level. An RPDefect flag is set to "1" in step 355 while the RFRP signal is lower than the RPDefect level. When the RFRP signal is higher than the RPDefect level, and then judging whether the RFRP signal is in defect delay time or not (step 352). In step 354, the RPDefect flag is set to "1" while the RFRP signal is in defect delay time. However, while the RFRP signal is higher than the RPDefect level and is not in the defect delay time, the RPDefect flag is set to "0" in step 353. When the Interruption flag signal transit from "0" to "1", it means a defect is detected. The RPDefect detection detects a defect via further processing the RF signal thus it is more sensitive for detecting defects. Due to its sensitive ability to detect defects, the RPDefect detection is suitably used to detect a small scratch and an interruption defect.

Figure 3F:
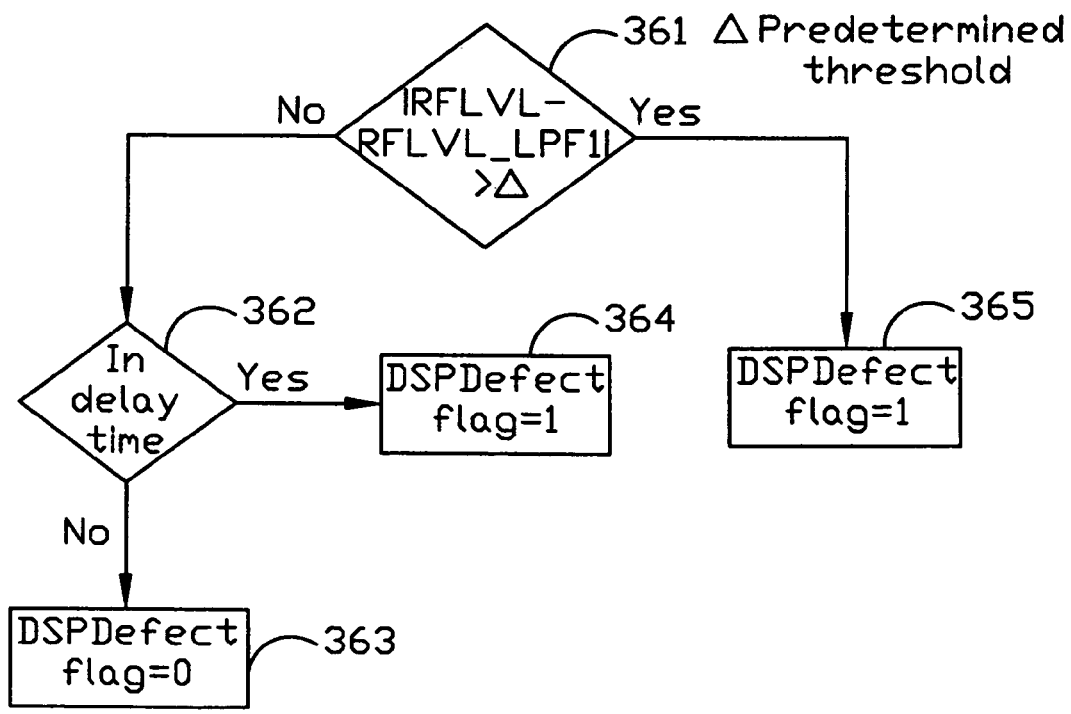

Referring to FIG. 3F, the flow charts of DSPDefect detection is illustrated. All steps in FIG. 3F are similar to those in FIG. 3A. In step 361, comparing an absolute difference value between an RFLVL and an RFLVL_LPF with a predetermined threshold. Wherein, the RFLVL_LPF signal is a slowly falling signal of the RFLVL signal passed a low pass filter. A DSPDefect flag is set to "1" in step 365 while an absolute difference value between an RFLVL and an RFLVL_LPF is bigger than the predetermined threshold. When the absolute difference value between the RFLVL and the RFLVL_LPF is smaller than the predetermined threshold, and then judging whether the moment is in defect delay time or not (step 362). In step 364, the DSPDefect flag is set to "1" while the moment is in defect delay time. However, When the absolute difference value between the RFLVL and the RFLVL_LPF is smaller than the predetermined threshold and the moment is not in the defect delay time, the DSPDefect flag is set to "0" in step 363. When the DSPDefect flag signal transit from "0" to "1", it means a defect is detected. The DSPDefect detection detects a defect through a variable threshold thus a fixed DC referred voltage level is unnecessary.

Figure 4:
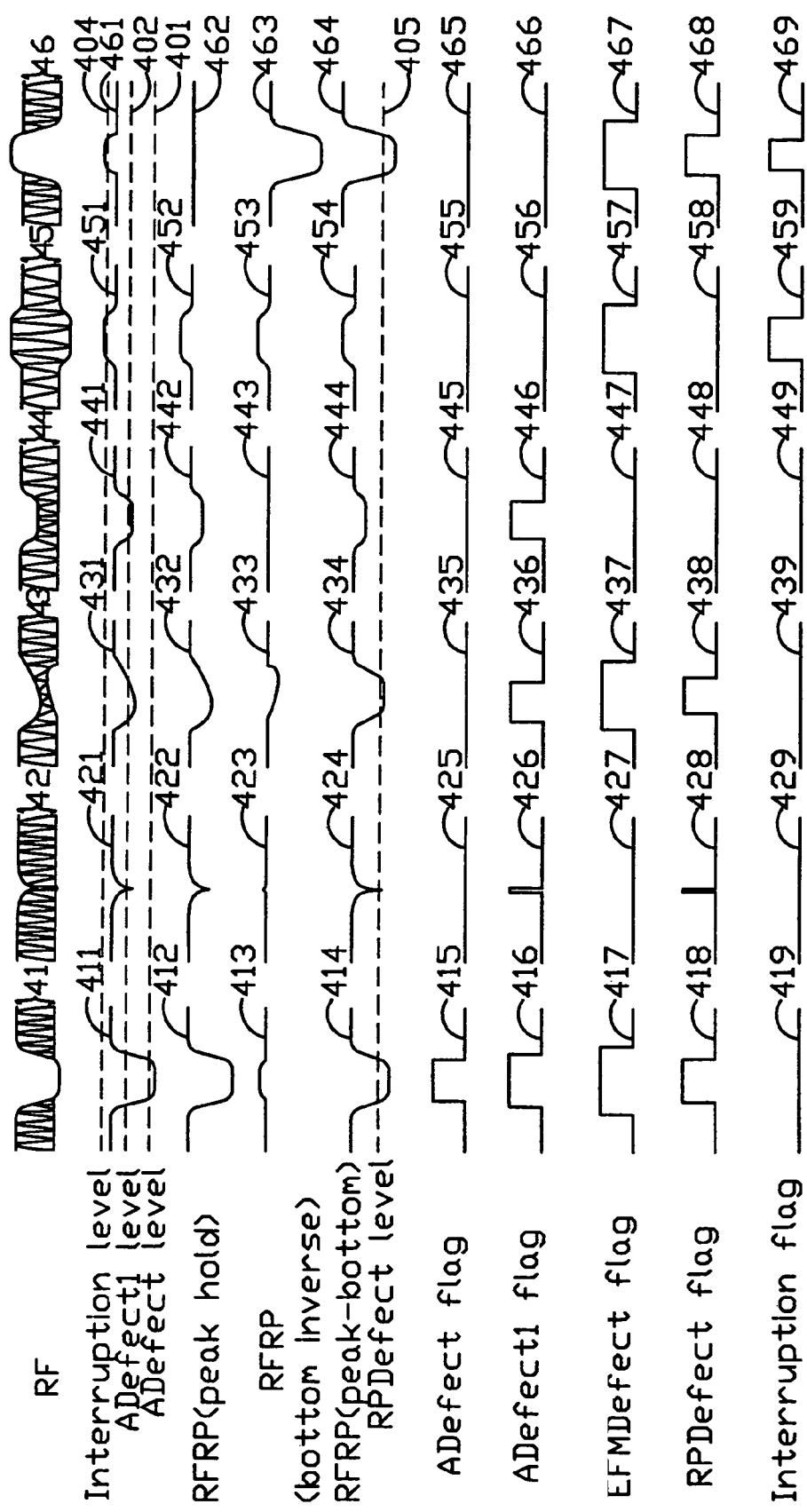
FIG. 4 illustrates different defect signals detected by applying defect detection in accordance with the present invention.

As shown in FIG. 4, some defect signals detected by applying the defect detection in accordance with the present invention are illustrated. An RF signal 41 has a deep hollow thus its envelope signal 411 also has the deep hollow. According to the ADefect1 and the ADefect detection mentioned before, an ADefect1 flag signal 416 and an ADefect flag signal 415 are respectively set from "0" to "1" while the envelope signal 411 is lower than an ADefect1 level 402 and an ADefect level 401. The EFMDefect flag signal 417 is set from "0" to "1" as well because the hollow is wide enough and generates abnormal data length. The Interruption flag signal 419 has no response to the hollow since the envelope signal 411 is always smaller than an Interruption level 404. An RFRP signal (peak hold) 412 and an RFRP (bottom-inverse) signal 413 respectively show the peak envelope and the inversed bottom envelope of the RF signal 41. Further, an RFRP (peak-bottom) signal 414 is formed through the RFRP (peak hold) signal 412 subtracting the RFRP (bottom-inverse) signal 413. An RPDefect flag signal 418 is set from "0" to "1" as the RFRP (peak-bottom) signal 414 is lower than an RPDefect level 405. The deep hollow caused by a deep defect, such as a scratch, can be detected out through the ADefect, the ADefect1, the EFMDefect, and the RPDefect detections, since its depth and width are deep and wide enough for those defect detections.

An RF signal 42 has a shallow and narrow hollow thus its envelope signal 421 also has the same form. According to the ADefect1 detection, an ADefect1 flag signal 426 is set from "0" to "1" while the envelope signal 421 is lower than the ADefect1 level 402. An RFRP (peak hold) signal 422 and an RFRP (bottom-inverse) signal 423 respectively show the peak envelope and the inversed bottom envelope of the RF signal 42. Further, an RFRP (peak-bottom) signal 424 is formed through an RFRP (peak hold) signal 422 subtracting an RFRP (bottom-inverse) signal 423. An RPDefect flag signal 428 is set from "0" to "1" as the RFRP (peak-bottom) signal 424 is lower than the RPDefect level 405. However, an ADefect flag signal 425, an EFMDefect flag signal 427, and an Interruption flag signal 429 have no response to the shallow and narrow hollow, since the envelope signal 421 is always higher than the ADefect level 401, unsatisfying the conditions of the EFMDefect detection mentioned before, and is always lower than the Interruption level 404, respectively. The shallow and narrow hollow probably caused by a shallow scratch can be only detected out through the ADefect1 and the RPDefect detection, since its depth and width are insufficient for other defect detection.

An RF signal 43 has a shallow and wide hollow thus its envelope signal 431 also has the same form. An ADefect1 flag signal 436 is set from "0" to "1" while the envelope signal 431 is lower than the ADefect1 level 402. An EFMDefect flag signal 437 is set from "0" to "1" as well, because the hollow is wide enough and generates abnormal data length. An RFRP (peak hold) signal 432 and an RFRP (bottom-inverse) signal 433 respectively show the peak envelope and the inversed bottom envelope of the RF signal 43. Further, an RFRP (peak-bottom) signal 434 is formed through the RFRP (peak hold) signal 432 subtracting the RFRP (bottom-inverse) signal 433. An RPDefect flag signal 438 is set from "0" to "1" as the RFRP (peak-bottom) signal 434 is lower than the RPDefect level 405. However, an ADefect flag signal 435 and an Interruption flag signal 439 have no response to the shallow and width hollow, since the envelope signal 431 is always higher than the ADefect level 401 and is always lower than the Interruption level 404. The shallow and wide hollow possibly caused by a shallow defect can be only detected out through the ADefect1, the EFMDefect and the RPDefect detection, since its depth and width are insufficient for other defect detections.

An RF signal 44 has a shallow and wide hollow thus its envelope signal 441 also has the same form. An ADefect1 flag signal 446 is set from "0" to "1" while the envelope signal 441 is lower than the ADefect1 level 402. An RFRP (peak hold) signal 442 and an RFRP (bottom-inverse) signal 443 respectively show the peak envelope and the inversed bottom envelope of the RF signal 44. Further, an RFRP (peak-bottom) signal 444 is formed through the RFRP (peak hold) signal 442 subtracting the RFRP (bottom-inverse) signal 443. An RPDefect flag signal 448 has no response to the shallow and width hollow, since the RFRP (peak-bottom) signal 444 is always higher than the RPDefect level 405. Moreover, an ADefect flag signal 445, an EFMDefect flag signal 447, and an Interruption flag signal 449 neither have no response to the shallow and wide hollow, since the envelope signal 441 is always higher than the ADefect level 401, unsatisfying the conditions of the EFMDefect detection mentioned before, and is always lower than the Interruption level 404, respectively. The shallow and wide hollow probably resulted from a fingerprint can be just detected out via the ADefect1 detection in this situation, since its depth and width are very deficient for other defect detections.

As for an RF signal 45 and an RF signal 46, both of them are caused from strong signal strengths, such as strong optical reflection, also called an interruption defect. The RF signal 45 has strong amplitudes at its peak and its bottom envelope thus its peak envelope signal 451 has the corresponding form. An EFMDefect flag signal 457 is set from "0" to "1" since the interruption defect is wide enough and generates abnormal data length. An Interruption flag signal 459 is also set from "0" to "1" as the envelope signal 451 is higher than the Interruption level 404. As for other flag signals, an ADefect1 flag signal 456 and an ADefect flag signal 455 have no response to the envelope signal 451 because the envelope signal 451 is always higher than the ADefect1 level 402 and the ADefect level 401. An RFRP (peak hold) signal 452 and an RFRP (bottom-inverse) signal 453 respectively show the peak envelope and the inversed bottom envelope of the RF signal 45. Further, an RFRP (peak-bottom) signal 454 is formed through the RFRP (peak hold) signal 452 subtracting the RFRP (bottom-inverse) signal 453. An RPDefect flag signal 458 has no response to this kind of interruption defect, since the RFRP (peak-bottom) signal 454 is higher than the RPDefect level 405 at all times. This kind of interruption defect can be just detected out via the EFMDefect and the Interruption detection mentioned before.

The RF signal 46 forms an inversed hollow from its bottom envelope thus its peak envelope signal 461 has the corresponding form. An EFMDefect flag signal 467 is set from "0" to "1" since the interruption defect is wide enough and generates abnormal data length. An RFRP (peak hold) signal 462 and an RFRP (bottom-inverse) signal 463 respectively show the peak envelope and the inversed bottom envelope of the RF signal 46. Further, an RFRP (peak-bottom) signal 464 has a deep hollow formed by the RFRP (peak hold) signal 462 subtracting the RFRP (bottom-inverse) signal 463. An RPDefect flag signal 468 is set from "0" to "1" while the RFRP (peak-bottom) signal 464 is lower than the RPDefect level 405. An Interruption flag signal 469 is set from "0" to "1" while the envelope signal 461 is higher than the Interruption level 404. However, an ADefect1 flag signal 466 and an ADefect flag signal 465 have no response to the signal 461 because the envelope signal 461 is higher than the ADefect1 level 402 and the ADefect level 401. This kind of interruption defect can be only detected out via the EFMDefect, the RPDefect, and the Interruption detection mentioned before.

Generally speaking, the ADefect1 detection is more suitable than the ADefect detection for small and shallow scratch detection. The RPDefect detection is more sensitive for small scratch detection. Hence, it should be understood that the defect detection mentioned in the present invention could be combined in variety for particular defect detection. For example, combining the ADefect1 and the EFMDefect detection via a logic "OR" operation for small scratch detection, or combining the ADefect1 and the EFMDefect detection via a logic "AND" operation for small scratch detection except unwanted fingerprint, etc.

Through applying aforementioned defect detection and a suitable combination thereof to trigger a protection method and device, a PLL can be protected from instability. Herein, the suitable combination prefers the EFMDefect detection. However, it should be understood that the aforementioned defect detection could trigger the protection method and device by individual and various combinations.

Figure 5:
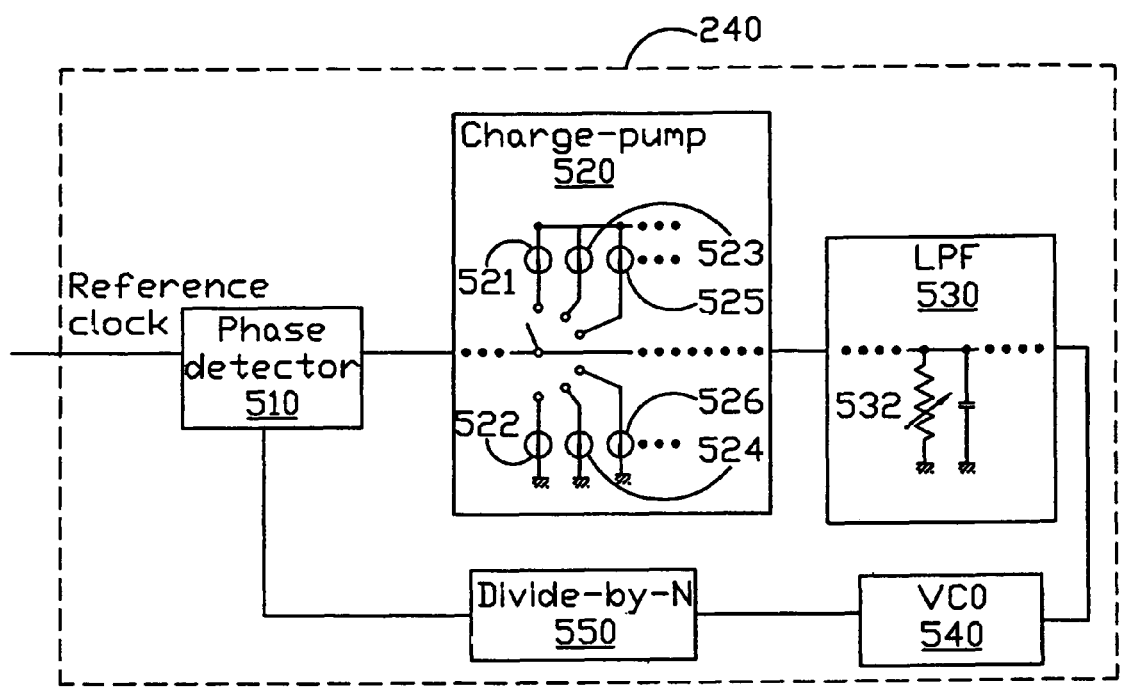
FIG. 5 illustrates a schematic PLL block diagram in accordance with the present invention.

Referring to FIG. 5, a PLL 240 includes a phase detector 510, a charge-pump 520, a low pass filter 530, a voltage controlled oscillator (VCO) 540, and a divide-by-N circuit 550. The phase detector 510 compares the phase of the reference clock and a divide-by-N circuit 550. The output of the phase detector 510 is sent to the charge-pump 520. The charge-pump 520 includes different charge-pump current sources, such as current sources 521-526, etc. for being selected to compensate the output of phase detector 510. Next, the output of charge-pump 520 is received by the low pass filter 530 to generate a control voltage for the VCO 540. The VCO 540 provides different resistances which are adjusted, such as a variable resistor 532, for providing different cut-off frequencies to generate different bandwidths, so that the frequency-shift of output of charge-pump 520 could be compensated.

One characteristic of the PLL 240 in accordance with the present invention is that the PLL 240 disables the charge-pump 520 and/or mutes the current of the charge-pump 520 to avoid frequency shift when a defect is detected. Another characteristic is that the PLL 240 also provides different charge-pump current sources, such as current sources 521-526, etc., in the charge-pump 520 and different resistances which are adjusted, such as a variable resistor 532, in the low pass filter 530 for obtaining different bandwidths to compensate frequency shift caused by the defect when/after the defect arises. By doing so, the unstable data affected by the defect has no any effects on the PLL. For example, the current sources 521-526, etc. in the charge-pump 520 are timely chosen to compensate an digitalized RF signal, which is affected by the defect, through pulling up or pulling down the current of the digitalized RF signal. And, through changing the resistance of the variable resistor 532, the low pass filter 530 thus has different cut-off frequencies generating different bandwidths to compensate the frequency shift of the digitalized RF signal, which is affected by the defect.

Although specific embodiments have been illustrated and described, it will be obvious to those skilled in the art that various modifications may be made without departing from what is intended to be limited solely by the appended claims.

What is claimed is:

1. A device for adjusting a phase lock loop (PLL) in reading signals on a defect optical disc, said device comprising:
   a defect detection unit, receiving a plurality of defect detection signals for setting a plurality of defect flag signals, wherein said plurality of defect detection signals comprise at least an envelope of a RF signal and bit modulation signals; and
   a logic combination unit, performing an logic operation on said defect flag signals in order to detect a specified defect; and
   a PLL in electrical communication with the logic combination unit, wherein said PLL comprises:
      a charge-pump with different charge-pump current sources selectable to provide different bandwidths for avoiding PLL frequency-shift caused by said specified defect while said specified defect is detected; and
      a low pass filter for receiving an output of the charge-pump and generating a control voltage output; and
      a voltage controlled oscillator (VCO) for receiving the control voltage output from the low pass filter, the VCO configured to provide different resistances which are adjusted to provide different bandwidths for avoiding PLL frequency-shift caused by said specified defect when said specified defect is detected.

2. The device according to claim 1, wherein said defect detection signals further include an envelope signal of an RF signal, an bit modulation signal, a peak envelope of said RF signal, a bottom envelope of said RIF signal, and a peak to bottom envelope of said RF signal.

3. The device according to claim 1, wherein said PLL disables said charge-pump to avoid PLL frequency-shift caused by said specified defect while said specified defect is detected.

4. The device according to claim 1, wherein said PLL mutes currents of said charge-pump to avoid PLL frequency-shift caused by said specified defect while said specified defect is detected.

5. A method for adjusting a phase lock loop (PLL) in reading signals on a defect optical disc, said method comprising:
   receiving a plurality of defect detection signals for setting a plurality of defect flag signals, wherein said plurality of defect detection signals comprises at least an envelope of a RF signal and bit modulation signals;
   executing a logic operation on said defect flag signals in order to detect a specified defect;
   avoiding PLL frequency-shift of an output of a charge-pump, caused by said specified defect by operation of the charge-pump with different charge-pump current sources selectable to provide different bandwidths, while said specified defect is detected; and
   providing different resistances which are adjusted to provide different bandwidths to avoid PLL frequency-shift caused by said specified defect when detecting said specified defect.

6. The method according to claim 5, wherein said avoiding includes disabling said charge-pump by said PLL to avoid PLL frequency-shift caused by said specified defect while said specified defect is detected.

7. The method according to claim 5, wherein said avoiding includes muting currents of said charge-pump by said PLL to avoid PLL frequency-shift caused by said specified defect while said specified defect is detected.

* * * * *